(12) United States Patent
Mori et al.

(10) Patent No.: US 7,201,394 B2
(45) Date of Patent: Apr. 10, 2007

(54) AIRBAG APPARATUS

(75) Inventors: Kenji Mori, Aichi-ken (JP); Hiroyuki Kobayashi, Aichi-ken (JP); Yuji Kuriyama, Aichi-ken (JP); Tadashi Yamamoto, Aichi-ken (JP); Toru Koyama, Aichi-ken (JP); Toshinori Tanase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/130,216

(22) Filed: May 17, 2005

(65) Prior Publication Data

US 2005/0206136 A1 Sep. 22, 2005

Related U.S. Application Data

(63) Continuation of application No. 10/411,117, filed on Apr. 11, 2003, now abandoned.

(30) Foreign Application Priority Data

Apr. 11, 2002 (JP) ............................ 2002-109534
Apr. 11, 2002 (JP) ............................ 2002-109535

(51) Int. Cl.
*B60R 21/215* (2006.01)
(52) U.S. Cl. .................................. 280/728.3
(58) Field of Classification Search ............ 280/728.3, 280/730.2, 732, 734, 735
See application file for complete search history.

(56) References Cited

U.S. PATENT DOCUMENTS

| 3,481,626 A | 12/1969 | Fergle | |
| 3,623,768 A | 11/1971 | Capener et al. | 280/730.2 |
| 3,664,682 A | 5/1972 | Wycech | 280/730.1 |
| 5,026,092 A | 6/1991 | Abramczyk | |
| 5,074,583 A | 12/1991 | Fujita et al. | 280/730.1 |
| 5,295,712 A | 3/1994 | Omura | |
| 5,324,071 A | 6/1994 | Gotomyo et al. | |
| 5,344,184 A | 9/1994 | Keeler et al. | 280/730.1 |
| 5,505,487 A | 4/1996 | Brown et al. | 280/730.1 |
| 5,507,521 A | 4/1996 | Steffens, Jr. | 280/731 |
| 5,730,458 A | 3/1998 | Byon | 280/730.2 |

(Continued)

FOREIGN PATENT DOCUMENTS

DE 41 37 719 A1 11/1991

(Continued)

OTHER PUBLICATIONS

First Office Action issued from German Patent Office issued on Oct. 10, 2005 for the corresponding German patent application No. 103 16 543.6-42(a copy and English translation thereof).

(Continued)

*Primary Examiner*—Paul N. Dickson
*Assistant Examiner*—Laura B. Rosenberg
(74) *Attorney, Agent, or Firm*—Posz Law Group, PLC

(57) ABSTRACT

An airbag apparatus has an airbag, an inflator, a cover and an opening mechanism. When an impact the magnitude of which is greater than a predetermined value is applied to the vehicle, the inflator supplies gas to the airbag. The cover covers the airbag. The opening mechanism opens the cover prior to inflation of the airbag.

7 Claims, 17 Drawing Sheets

U.S. PATENT DOCUMENTS

| | | |
|---|---|---|
| 5,738,369 A | 4/1998 | Durrani |
| 5,842,717 A | 12/1998 | Wohllebe et al. ........... 280/734 |
| 5,848,803 A * | 12/1998 | Tonooka et al. ........... 280/740 |
| 5,871,233 A | 2/1999 | Tanaka et al. |
| 5,897,135 A | 4/1999 | Oehm |
| 5,899,488 A * | 5/1999 | Muller .................... 280/728.3 |
| 6,024,377 A | 2/2000 | Lane, Jr. .................... 280/732 |
| 6,189,920 B1 | 2/2001 | Bayley |
| 6,315,321 B1 * | 11/2001 | Lutz ........................ 280/728.3 |
| 6,349,963 B1 | 2/2002 | Muller .................... 280/728.3 |
| 6,463,372 B1 | 10/2002 | Yokota et al. ................ 701/45 |
| 6,464,252 B1 | 10/2002 | Kreuzer ................... 280/728.2 |
| 6,527,295 B2 | 3/2003 | Muller .................... 280/728.3 |
| 6,581,959 B2 | 6/2003 | Muller .................... 280/728.3 |
| 6,755,273 B2 | 6/2004 | Breed ...................... 280/730.2 |
| 6,910,715 B2 | 6/2005 | Andersson |
| 6,983,954 B2 | 1/2006 | Sakaguchi |
| 2001/0019204 A1 | 9/2001 | Reiter et al. ................ 280/736 |
| 2002/0163166 A1 | 11/2002 | Muller .................... 280/728.3 |
| 2005/0017484 A1 | 1/2005 | Worrell et al. |

FOREIGN PATENT DOCUMENTS

| | | |
|---|---|---|
| DE | 42 17 174 | 11/1993 |
| DE | 42 31 522 | 3/1994 |
| DE | 44 26 090 | 7/1995 |
| DE | 198 29 239 | 1/1999 |
| DE | 198 20 212 A1 | 11/1999 |
| DE | 198 53 322 A1 | 5/2000 |
| DE | 101 08 169 | 9/2002 |
| EP | 0 357 225 A1 | 7/1989 |
| EP | 1 234 731 | 2/2002 |
| JP | U-H05-5616 | 1/1993 |
| JP | A-H07-40800 | 2/1995 |
| JP | A-H07-125608 | 5/1995 |
| JP | A-08-026062 | 1/1996 |
| JP | A-H08-67226 | 3/1996 |
| JP | A-H09-142311 | 6/1997 |
| JP | A-H11-321552 | 11/1999 |
| JP | A-2000-177452 | 6/2000 |
| JP | A-2000-318623 | 11/2000 |
| JP | A 2001-206176 | 7/2001 |
| WO | WO 01/83272 A1 | 11/2001 |

OTHER PUBLICATIONS

List of References and Relevance (2 pages).

Office Communication dated Sep. 19, 2006 from Japanese Patent Office for counterpart application of JP2002-109534.

Office Action from Japanese Patent Office issued on Nov. 28, 2006 for the corresponding Japanese patent application No. 2002-109535 (a copy thereof).

Information Sheet for IDS.

* cited by examiner

AIRBAG APPARATUS

CROSS REFERENCES TO RELATED APPLICATIONS

This application is a continuation application of U.S. application Ser. No. 10/411,117, which was filed on 11 Apr. 2003 now abandoned.

BACKGROUND OF THE INVENTION

The present invention relates to an airbag apparatus used for vehicles.

Conventionally, airbag apparatuses that are located in the center of a steering wheel are known. Such an airbag apparatus includes an airbag and an inflator for supplying inflating gas to the airbag. The inflator is provided between spokes of the steering wheel and below the pad of the steering wheel. The pad includes a thin portion that corresponds to the outer shape of the airbag apparatus. When an impact the magnitude of which is equal to or greater than a predetermined value is applied to the vehicle, the inflator supplies gas to the airbag. Accordingly, the airbag breaks the pad at the thin portion and is deployed at the outside of the steering wheel. This reduces the influence of the impact of collision to the occupant.

In an airbag apparatus described above, the pad is broken along the thin portion, and an opening, or a port, is formed during an initial stage of the airbag deployment. Therefore, some of the energy for deploying the airbag is used for breaking the thin portion. This extends the time required for the airbag deployment to be completed.

As another type of a prior art airbag apparatus, Japanese Laid-Open Patent Publication No. 2001-206176 discloses an airbag apparatus 300 shown in FIGS. 24 to 26. As shown in FIG. 24, a first airbag module is provided in a door 210. The first airbag module includes a first inflator 288, a first airbag 282, and a contacting plate 286. When a collision of the vehicle is predicted based on detection by a pre-crash sensor (not shown), the first inflator 288 is activated to deploy the first airbag 282 toward the interior of a vehicle passenger compartment S as shown in FIG. 25. The deployment moves the contacting plate 286 toward the interior of the passenger compartment S and pushes an occupant toward the interior of the passenger compartment S.

A second airbag module is supported on the first airbag 282. The second airbag module includes a second inflator 290 and a second airbag 284. When the first airbag 282 is deployed, the second airbag module is pushed into the passenger compartment S. Thereafter, when a collision sensor (not shown) detects a collision of the vehicle, the second inflator 290 is activated and deploys the second airbag 284 between the occupant and the door 210 as shown in FIG. 26. This reduces the influence of the impact of the collision to the occupant.

The second airbag 284 is projected into the passenger compartment S in an undeployed state when the first airbag 282 is deployed. However, after being projected, the second airbag 284 is inflated on the unstable first airbag 282. Therefore, the second airbag 284, which chiefly protects the occupant, can be inflated at a position that is not suitable for protection. Even if the second airbag 284 is deployed at a position corresponding to the occupant, the second airbag 284 can be displaced due to contact with the occupant and therefore cannot effectively absorb the impact. Accordingly, the second airbag 284 cannot effectively protect the occupant under certain circumstances.

SUMMARY OF THE INVENTION

Accordingly, it is an objective of the present invention to provide an airbag apparatus that deploys an airbag in a reliable manner.

To achieve the foregoing and other objectives and in accordance with the purpose of the present invention, an airbag apparatus used for a vehicle is provided. The apparatus includes an airbag, an inflator, a cover, and an opening mechanism. When an impact the magnitude of which is greater than a predetermined value is applied to the vehicle, the inflator supplies gas to the airbag, thereby deploying and inflating the airbag. The cover covers the airbag. The opening mechanism opens the cover prior to inflation of the airbag.

The present invention provides another airbag apparatus used for a vehicle. The apparatus includes an airbag, an inflating device, and a deploying device. The inflating device inflates the airbag. Prior to inflation of the airbag, the deploying device deploys the airbag in a folded state over a predetermined inflation region.

In another aspect of the present invention, a method for deploying and inflating an airbag used for a vehicle is provided. The method includes: predicting a collision against the vehicle; opening a cover covering the airbag when a collision is predicted; detecting a collision against the vehicle; and deploying and inflating the airbag by supplying gas to the airbag when a collision is detected.

The present invention provides another method for deploying and inflating an airbag used for a vehicle. The method includes: predicting a collision against the vehicle; deploying the airbag in a folded state over a predetermined inflation region when a collision is predicted; detecting a collision against the vehicle; and inflating the deployed airbag when a collision is detected.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 3.

Figure 1:
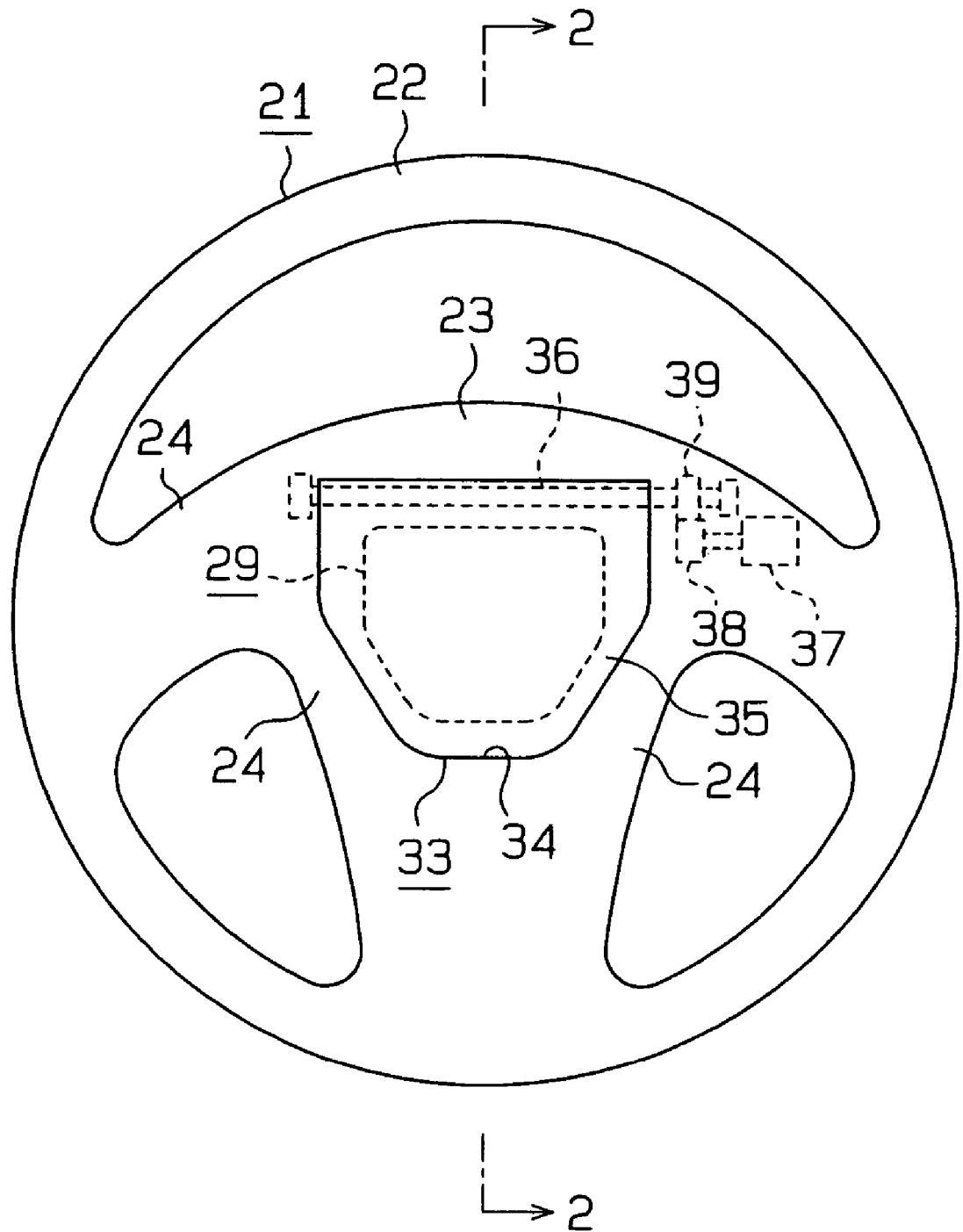
FIG. 1 is a front view illustrating a steering wheel equipped with an airbag apparatus according to a first embodiment of the present invention.
Figure 2:
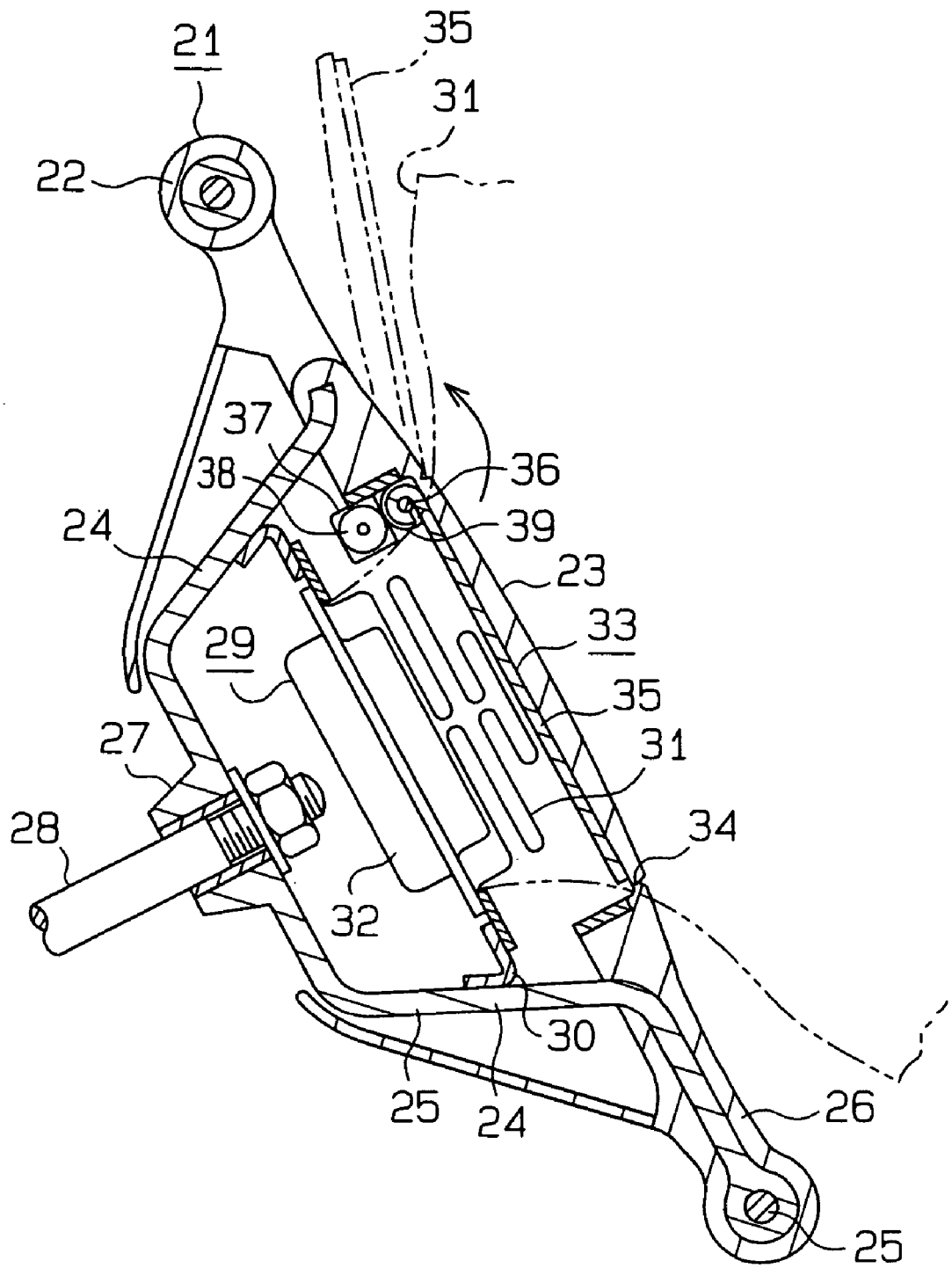
FIG. 2 is an enlarged cross-sectional view taken along line 2—2 of FIG. 1.

As shown in FIGS. 1 and 2, a steering wheel 21 located in the passenger compartment of a vehicle includes an annular gripping ring 22, a pad 23 arranged in the center of the ring 22, and three spokes 24 connecting the ring 22 with the pad 23. The ring 22 and the spokes 24 include a core 25 made of aluminum alloy and a surface layer 26 covering the core 25. The surface layer 26 is made of a soft synthetic resin. A boss 27 is formed in the center of the core 25. The steering wheel 21 is attached to a steering shaft 28 at the boss 27.

An airbag module 29 is located in the center of the steering wheel 21. Specifically, the airbag module 29 is located in a space defined by the pad 23 and the core 25 and is attached to the inner side of the core 25 with a support plate 30. The airbag module 29 includes an airbag 31 in a folded state and an inflator 32. The inflator 32 supplies gas to deploy and inflate the airbag 31.

An opening-closing mechanism 33 is located between the airbag 31 and the pad 23. The opening-closing mechanism 33 functions as an opening mechanism for forming an opening at a part that covers the airbag 31 prior to deployment of the airbag 31. The opening-closing mechanism 33 also functions as a closing mechanism for closing the port 34.

That is, the port 34 is formed in the pad 23 of the steering wheel 21. A cover 35 is attached to the pad 23 with a rotary shaft 36 to selectively open and close the port 34. An opening-closing motor 37 is attached to the core 25 of the steering wheel 21. The motor 37 rotates the rotary shaft 36 with gears 38, 39. The cover 35 is pivoted between an open position shown by broken lines in FIG. 2 and a closed position shown by solid lines in FIG. 2.

The circuitry of the airbag apparatus will now be described.

A controller 40 (shown in FIG. 3) stores programs for controlling the operation of the entire airbag apparatus. A memory 41 is connected to the controller 40. The memory 41 stores data, such as data related to the timing at which the cover 35 is closed after being opened.

A pre-crash sensor 42 and a collision sensor 43 are connected to the controller 40. The pre-crash sensor 42 is located in a front portion of the vehicle. A pre-crash sensor 42 transmits ultrasonic wave or radio wave frontward to detect an object such as an approaching vehicle. Based on detection signals from the pre-crash sensor 42, the controller 40 obtains the relative speed and distance between the object located in front and the vehicle on which the controller 40 is mounted, and predicts the possibility of a crash. The collision sensor 43 is located in a front portion of the vehicle. The collision sensor 43 detects an actual frontal collision and sends a collision detection signal to the controller 40.

The motor 37 and the inflator 32 are connected to the controller 40. When predicting a frontal collision based on detection by the pre-crash sensor 42, the controller 40 drives the motor 37 to pivot the cover 35 to the open position. As a result, the airbag module 29 is exposed to the occupant through the port 34 in the pad 23.

When receiving a collision detection signal from the collision sensor 43 while the cover 35 is opened, the controller 40 activates the inflator 32, thereby supplying gas from the inflator 32 to the airbag 31. Accordingly, the airbag 31 is deployed through the port 35 to the exterior of the steering wheel 21. When the cover 35 is open, if the controller 40 receives no collision detection signal from the collision sensor 43 for a predetermined period from when a collision is predicted, the controller 40 drives the motor 37 to rotate in a reverse direction to pivot the cover 35 to the closed position. As a result, the port 34 is closed.

An opening switch 44 is connected to the controller 40. When the opening switch 44 is manually turned on, the motor 37 is activated to open the cover 35 regardless of detection state of the pre-crash sensor 42. If the opening switch 44 is turned on subsequently, the cover 35 is closed.

An operation of the airbag apparatus will now be described.

During normal driving of the vehicle, the cover 35 is at the closed position as shown by solid lines in FIG. 2, and the port 34 remains closed. In this state, if the controller 40 predicts a frontal collision based on detection by the pre-crash sensor 42, the controller 40 controls the motor 37 to rotate, thereby pivoting the cover 35 to the open position shown by broken lines in FIG. 2. In response to the rotation, the airbag module 29 is exposed to the outside through the port 34 in the pad 23.

Thereafter, when the collision sensor 43 detects an actual frontal collision, a collision detection signal is sent to the controller 40. Accordingly, the inflator 32 is activated and supplies gas to the airbag 31 to deploy the airbag 31 through the port 34 toward the body of the occupant. The deployment of the airbag 31 effectively absorbs the impact applied to the occupant due to the collision.

On the other hand, if no collision detection signal is outputted by the collision sensor 43 until a predetermined period has elapsed since when a collision is predicted, the controller 40 causes the motor 37 to rotate in the reverse direction. The reverse rotation pivots the cover 35 to the closed position shown by solid lines in FIG. 2, and the port 34 of the pad 23 is closed.

A friction clutch (not shown) is located between the output shaft of the motor 37 and the cover 35. If the cover 35 is not opened for some reason when a collision is predicted, the cover 35 is pushed in the opening direction by the deployment of the airbag 31 due to the collision, and the friction clutch slips, which opens the cover 35. If the collision sensor 43 detects an unpredicted collision, the deployment of the airbag 31 causes the cover 35 to slip the friction clutch, and the cover 35 is opened.

This embodiment provides the following advantages.

Before the airbag 31 is deployed with gas supplied by the inflator 32, the opening-closing mechanism 33 opens the port 34 at a portion covering the airbag 31. This permits the airbag 31 to be deployed without delay. Also, the energy for deployment is not wasted for opening the port 34 and is effectively used for protecting the occupant.

Figure 24:
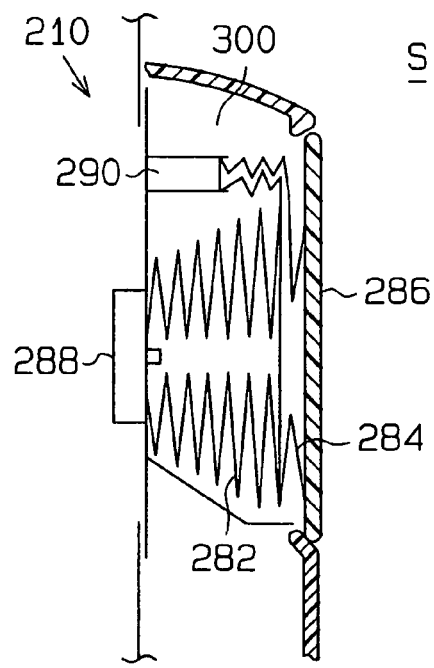
FIG. 24 is an enlarged partial cross-sectional view illustrating a prior art airbag apparatus in a non-activated state.
Figure 25:
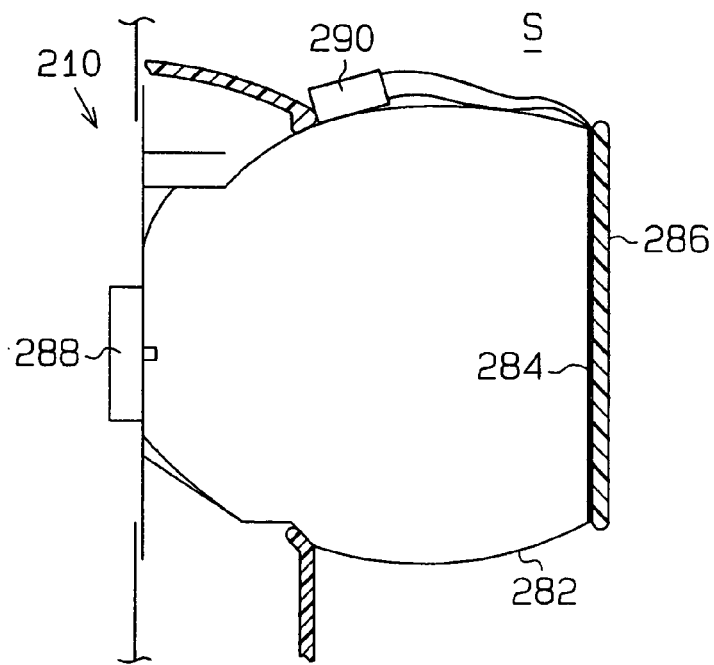
FIG. 25 is an enlarged partial cross-sectional view illustrating the airbag apparatus shown in FIG. 24 when a collision is predicted.
Figure 26:
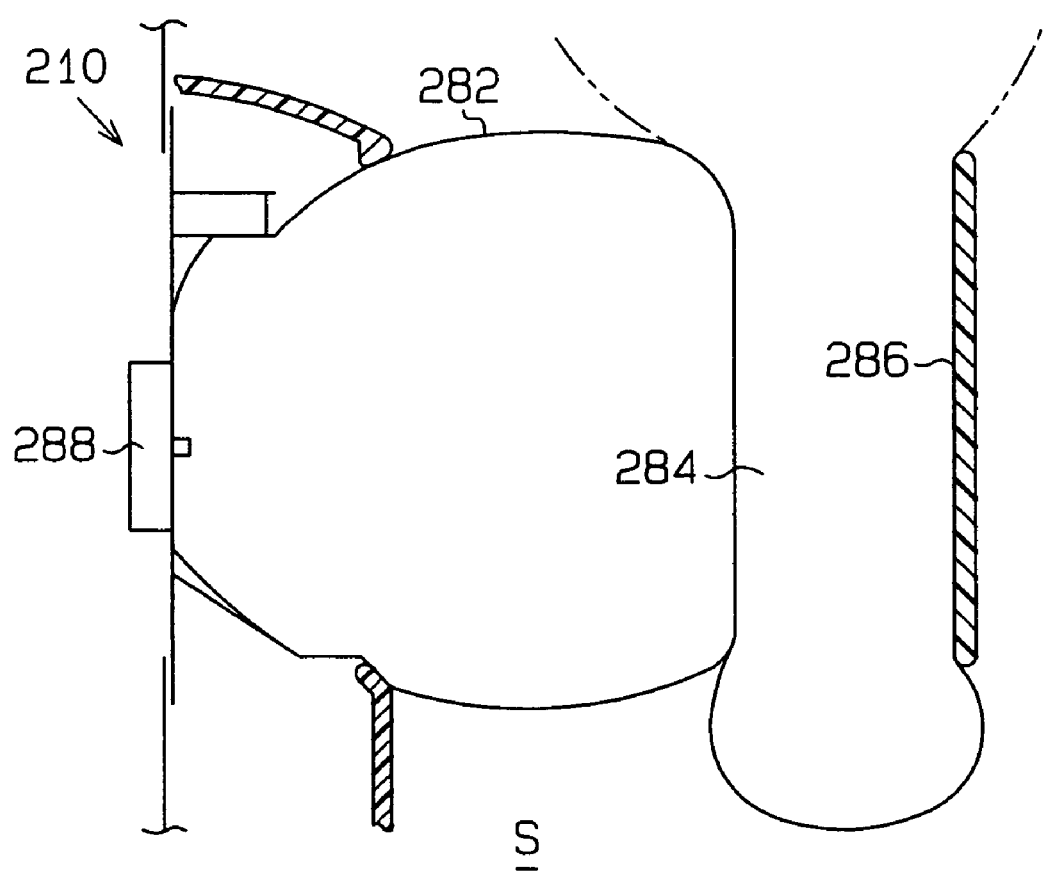
FIG. 26 is an enlarged partial cross-sectional view illustrating the airbag apparatus shown in FIG. 24 when a collision occurs.

The airbag 31 is deployed through the port 34. That is, unlike the prior art shown in FIGS. 24 to 26, the airbag 31 of this embodiment does not break a thin portion of when deployed. This permits the airbag 31 to be appropriately deployed to a predetermined position to readily protect the occupant.

Regardless of collision predictions based on detection of the pre-crash sensor 42, the cover 35 is arbitrarily opened by manipulating the opening switch 44. This permits the airbag module 29 to checked and replaced.

The opening-closing mechanism 33 is activated based on a frontal collision predicted by the pre-crash sensor 42. Therefore, port 34 is opened within a period from when a prediction of a collision to when the collision sensor 43 actually detects the collision. Therefore, the port 34 is readily opened prior to deployment of the airbag 31, and the energy of deployment of the airbag 31 is effectively and solely for protecting the occupant.

The opening-closing mechanism 33 also functions to close the port 34. Therefore, if a frontal collision is avoided after the port 34 is opened at part corresponding to the airbag 31, the port 34 is closed to restore the original state. Therefore, the occupant can continue manipulating the steering wheel like before the port 34 was opened.

Further, the opening-closing mechanism 33 functions to open and close the port 34. This simplifies the structure of the airbag apparatus. The single opening-closing mechanism 33 permits the port 34 to be smoothly opened and closed.

A second embodiment of the present invention will now be described with reference to FIGS. 4 and 5. The differences from the embodiment shown in FIGS. 1 to 3 will mainly be discussed. In the second embodiment, a pre-crash sensor 42 is located in each side portion of the vehicle and is used to predict a collision to the side. Also, a collision sensor 43 is located in each side portion of the vehicle to detect an actual collision.

Figure 3:
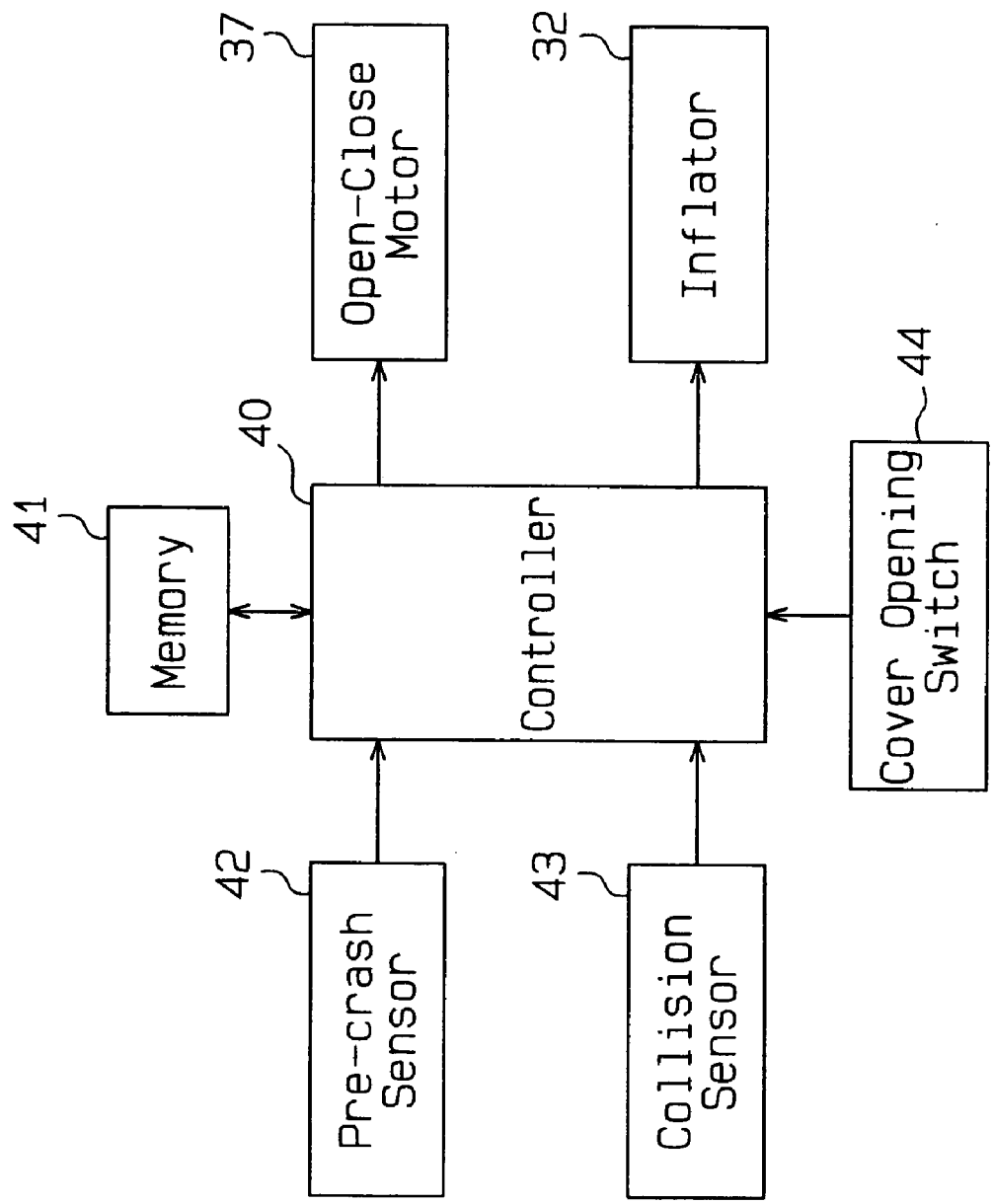
FIG. 3 is a block diagram showing the circuitry of the airbag apparatuses shown in FIG. 1.
Figure 4:
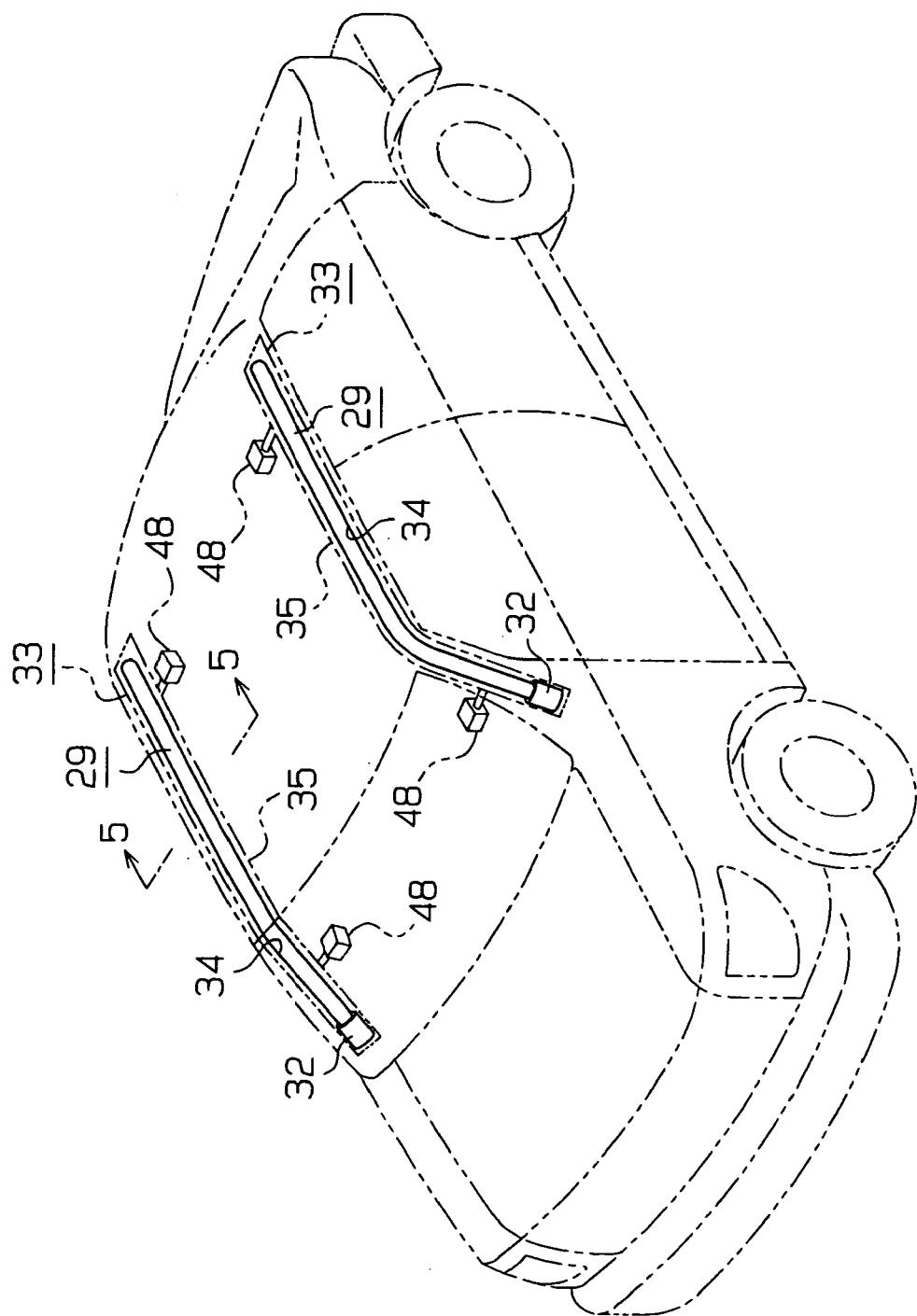
FIG. 4 is a perspective view showing a vehicle equipped with airbag apparatuses according to a second embodiment.
Figure 5:
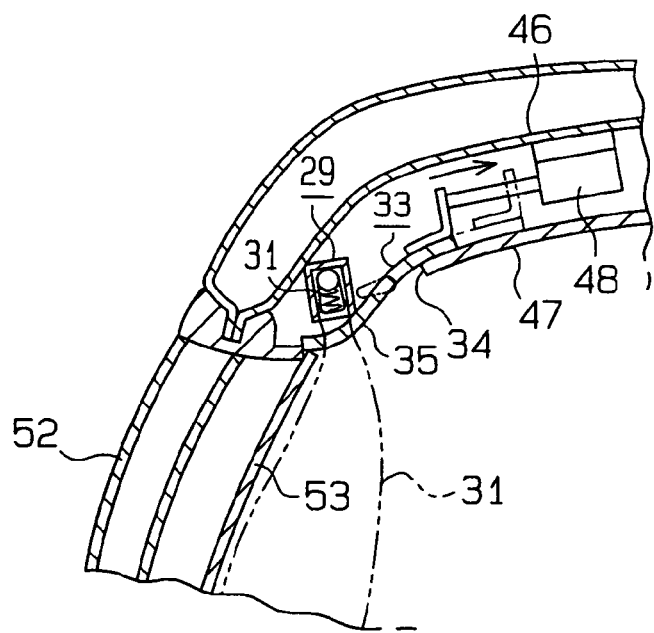
FIG. 5 is an enlarged partial cross-sectional view taken along line 5—5 of FIG. 4.

As shown in FIGS. 4 and 5, two airbag modules 29 are accommodated in each side portion of an inner roof 46 of the vehicle. A port 34 is formed in a head lining 47 of the inner roof 46 below each airbag module 29. A cover 35 closes each port 34. Two opening-closing solenoids 48 are located in each side portion of the inner roof 46. The covers 35 and the opening-closing solenoids 48 function as an opening closing mechanism 33. The armature of each opening-closing solenoid 48 is coupled to the corresponding cover 35. In this embodiment, instead of the motor 37 shown in FIG. 3, the opening-closing solenoids 48 are connected to the controller 40. Similar electrical components in the subsequent embodiments are also connected to the controller 40.

When the controller 40 predicts a crash at a side of the vehicle based on one of the pre-crash sensors 42, the opening-closing solenoid 48 at the corresponding side are excited. In response to the excitation of the corresponding opening-closing solenoids 48, the corresponding cover 35 is moved to an open position as shown by broken lines in FIG. 5, and the port 34 is opened directly below the corresponding airbag module 29. If the corresponding collision sensor 43 detects a collision, the corresponding inflator 32 is activated to deploy the airbag 31 through the port 34 along the inner side of the corresponding doors. The airbag 31 effectively absorbs the impact applied to an occupant from the side of the vehicle. If the collision is avoided after the port 34 is opened and a predetermined period has elapsed since the collision is predicted, the opening-closing solenoids 48 perform a restoring operation to move the cover 35 to a closed position shown by solid lines in FIG. 5.

This embodiment provides substantially the same advantages as the first embodiment shown in FIGS. 1 to 3.

A third embodiment of the present invention will now be described with reference to FIG. 6. The differences from the embodiment shown in FIGS. 4 to 5 will mainly be discussed.

Figure 6:
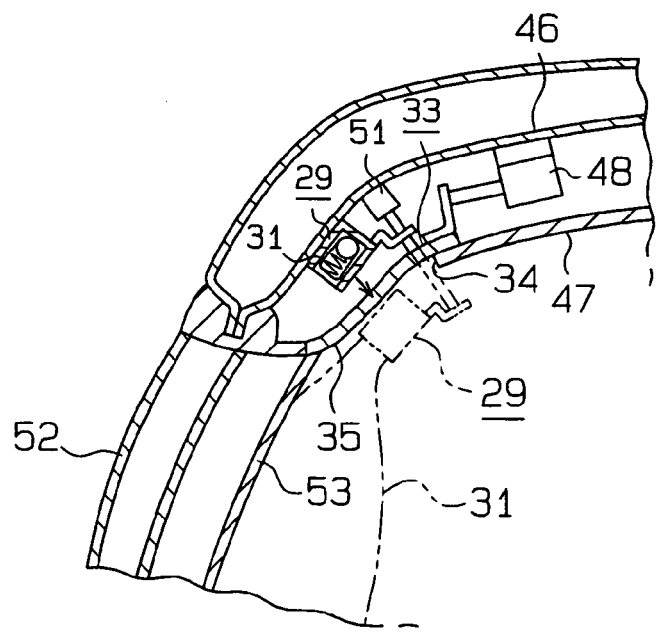
FIG. 6 is a partial cross-sectional view illustrating a vehicle equipped with an airbag apparatus according to a third embodiment.

As shown in FIG. 6, in this embodiment, an airbag module 29 is movably accommodated in an inner roof 46. As in the embodiment of FIGS. 4 and 5, when a collision is predicted based on detection by the pre-crash sensor 42, the opening-closing solenoid 48 is excited to move the cover 35 to an open position. Accordingly, a port 34 is opened below the airbag module 29.

A displacing solenoid 51 is accommodated in the inner roof 46. The displacing solenoid 51 functions as a displacing mechanism. The armature of the displacing solenoid 51 is coupled to the airbag module 29. When the port 34 is opened, the airbag module 29 is moved toward the interior of the vehicle passenger compartment in response to excitation of the displacing solenoid 51. Therefore, the airbag 31 is capable of being deployed in a direction that does not interfere with the garnishes 53 of the pillar 52. The displacing solenoid 51 functions as a restoring mechanism for restoring the airbag module 29 to an initial position shown by solid lines in FIG. 6.

If the collision sensor 43 detects a collision, the inflator 32 is activated to deploy the airbag 31 without interfering with the garnishes 53 along the inner side of the window. The airbag 31 effectively absorbs the impact applied to an occupant from the side of the vehicle. If the collision is avoided after the airbag module 29 projects, the displacing solenoid 51 performs a restoring operation and moves the airbag module 29 to the initial position in the inner roof 46. Then, the opening-closing solenoid 48 performs a restoring operation to move the cover 35 to the closed position.

In addition to the advantages of the embodiment shown in FIGS. 4 to 5, this embodiment provides the following advantages.

The displacing solenoid 51 moves the airbag module 29 to a predetermined position prior to deployment of the airbag 31 with the port 34 is opened. Therefore, the airbag 31 does not interfere with surrounding members and is smoothly deployed. If the airbag 31 is deployed while the airbag module 29 is located in the inner roof 46, the airbag 31 is likely to interfere with the garnishes 53. However, in this embodiment, such interference is avoided and the deployment of the airbag 31 is not hindered.

The displacing solenoid 51 functions as a restoring mechanism for restoring the airbag module 29 of the airbag 31 to the initial position. This simplifies the structure of the airbag apparatus. Specifically, the single displacing solenoid 51 reliably moves the airbag module 29 from and back to the initial position.

A fourth embodiment of the present invention will now be described with reference to FIG. 7. The differences from the embodiment shown in FIGS. 1 to 3 will mainly be discussed.

Figure 7:
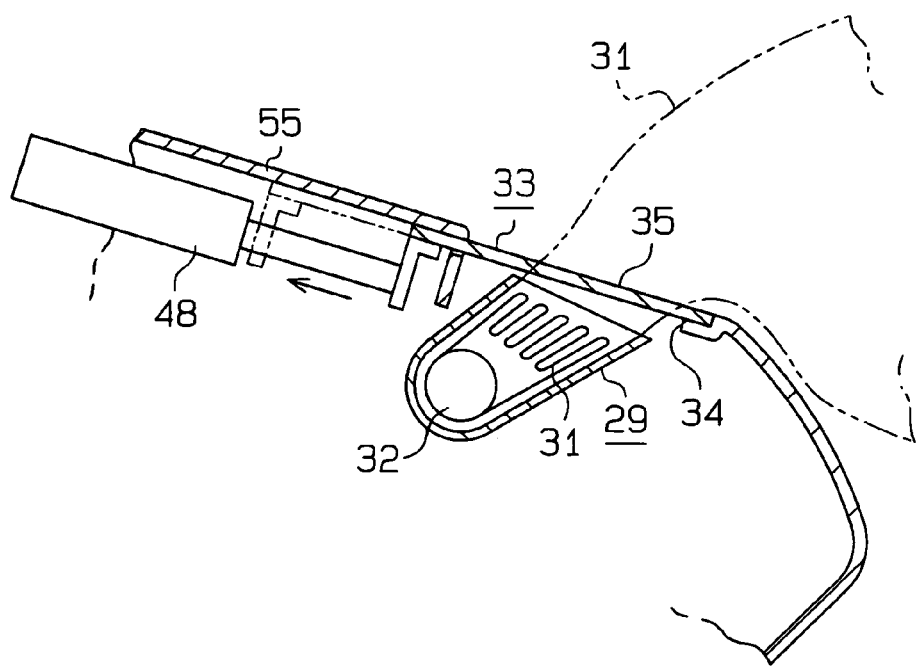
FIG. 7 is a partial cross-sectional view illustrating a vehicle equipped with an airbag apparatus according to a fourth embodiment.

As shown in FIG. 7, an airbag module 29 is located in an instrument panel 55 of the vehicle to correspond to an occupant on the front passenger seat. A port 34 is formed in an instrument panel 55 at a position corresponding to the airbag module 29. A opening-closing solenoid 48 is located in the instrument panel 55. The armature of the opening-closing solenoid 48 is coupled to a cover 35.

When a frontal collision is predicted based on detection by the pre-crash sensor 42, the opening-closing solenoid 48 is excited to move the cover 35 to an open position. Accordingly, a port 34 is opened to correspond to the opening of the airbag module 29. If the collision sensor 43 detects a frontal collision, the inflator 32 is activated to deploy the airbag 31 through the port 34 toward the occupant on the front passenger seat. The airbag 31 effectively absorbs the impact due to the frontal collision applied to the occupant. On the other hand, if a frontal collision is avoided after the port 34 is opened, the opening-closing solenoid 48 performs a restoring operation to move the cover 35 to the closed position.

This embodiment provides substantially the same advantages as the first embodiment shown in FIGS. 1 to 3.

A fifth embodiment of the present invention will now be described with reference to FIG. 8. The differences from the embodiment shown in FIGS. 1 to 3 will mainly be discussed.

Figure 8:
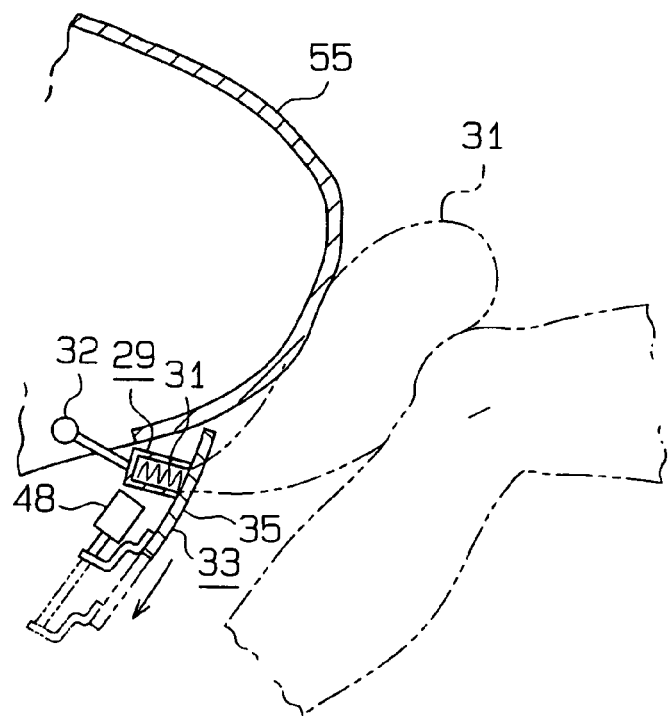
FIG. 8 is a partial cross-sectional view illustrating a vehicle equipped with an airbag apparatus according to a fifth embodiment.

As shown in FIG. 8, an airbag module 29 is located below an instrument panel 55 of the vehicle to correspond to the knee region of an occupant on the front passenger seat. A cover 35 is located between the airbag module 29 and an occupant. The cover 35 is movable vertically. When the opening-closing solenoid 48 is excited, the cover 35 is moved between an upper closed position and a lower open position. The covers 35 and the opening-closing solenoid 48 function as an opening closing mechanism 33.

When a frontal collision is predicted based on detection by the pre-crash sensor 42, the solenoid 48 is excited and moves the cover 35 to the lower open position shown by broken lines in FIG. 8. Then, the airbag module 29 is exposed to the occupant. That is, a port is formed at a side of the airbag module 29 that faces the occupant. If the collision sensor 43 detects a frontal collision in this state, the inflator 32 is activated to deploy the airbag 31 toward the knee region of the occupant. The airbag 31 effectively absorbs the impact applied to the lower limbs of the occupant on the front passenger seat. If the collision is avoided, the solenoid 48 performs a restoring operation to move the cover 35 to the closed position shown by solid lines in FIG. 8.

This embodiment provides substantially the same advantages as the first embodiment shown in FIGS. 1 to 3.

A sixth embodiment of the present invention will now be described with reference to FIG. 9. The differences from the embodiment shown in FIG. 8 will mainly be discussed.

Figure 9:
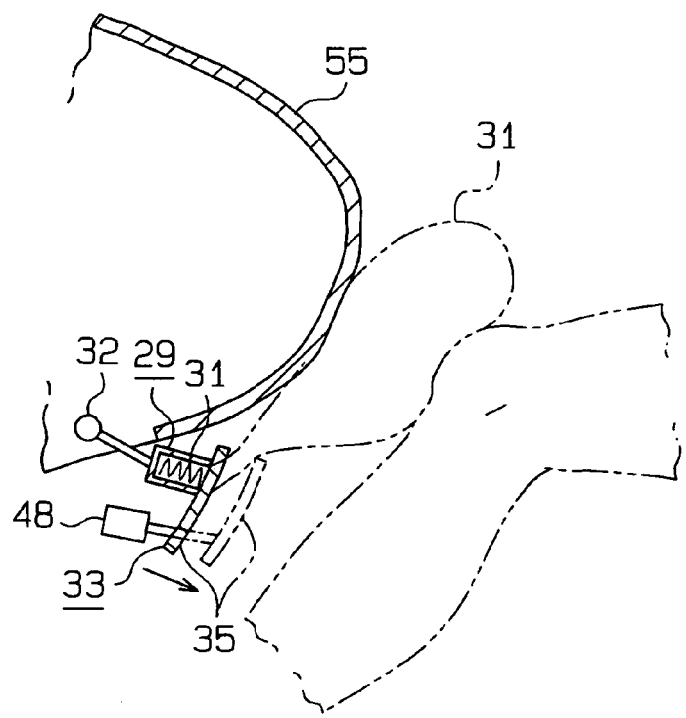
FIG. 9 is a partial cross-sectional view illustrating a vehicle equipped with an airbag apparatus according to a sixth embodiment.

As shown in FIG. 9, this embodiment is different from the embodiment of FIG. 8 in that the opening-closing solenoid 48 moves the cover 35 in a traveling direction of the vehicle. In response to excitation of the opening-closing solenoid 48, the cover 35 is selectively moved between a closed position shown by solid lines in FIG. 9 and an open position shown by broken lines in FIG. 9. In this embodiment, the closed position is forward of the open position in the traveling direction of the vehicle. When a collision is predicted and when a collision is detected, the airbag apparatus operates substantially in the same manner as the embodiment shown in FIG. 8.

In addition to the advantages of the embodiment shown in FIG. 8, this embodiment provides the following advantages.

When the cover 35 is moved to the open position, the cover 35 is moved rearward from the airbag module 29 in the moving direction of the vehicle. The cover 35 guides the deployment of the airbag 31. Therefore, the airbag 31 is deployed in the optimal direction, and readily and effectively protects the occupant.

A seventh embodiment of the present invention will now be described with reference to FIG. 10. The differences from the embodiment shown in FIG. 8 will mainly be discussed.

Figure 10:
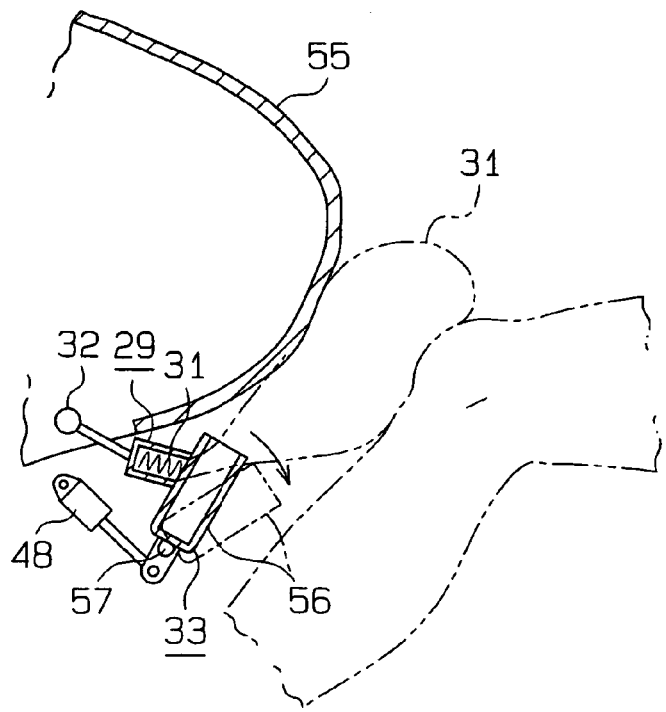
FIG. 10 is a partial cross-sectional view illustrating a vehicle equipped with an airbag apparatus according to a seventh embodiment.

As shown in FIG. 10, instead of the cover 35 of the embodiment shown in FIG. 8, an undertray 56 functioning also as a cover is rotatably supported by a support shaft 57. In response to excitation of the opening-closing solenoid 48, the undertray 56 is pivoted between a closed position shown by solid lines in FIG. 10 and an open position shown by broken lines in FIG. 10. At the closed position, the undertray 56 closes the side of the airbag module 29 facing the occupant. At the open poison, the undertray 56 opens the side of the airbag module 29 facing the occupant. When a frontal collision is predicted, the undertray 56 is pivoted to the open position. When the collision is actually detected, the airbag 31 is deployed. The undertray 56 guides the deployment of the airbag 31.

This embodiment provides substantially the same advantages as the embodiment shown in FIG. 9.

An eighth embodiment of the present invention will now be described with reference to FIGS. 11 and 12. The differences from the embodiment shown in FIGS. 1 to 3 will mainly be discussed.

Figure 11:
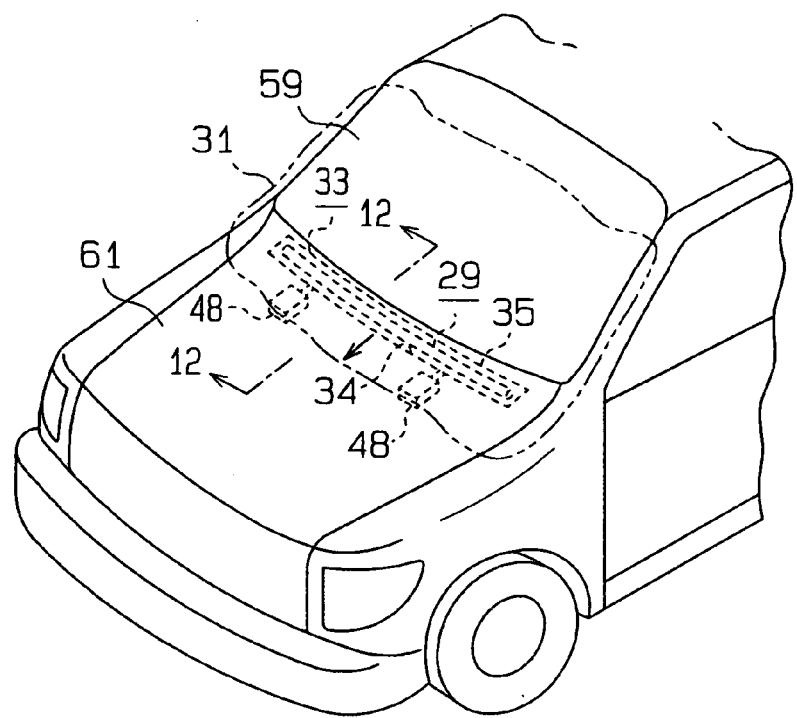
FIG. 11 is a partial perspective view illustrating a vehicle equipped with an airbag apparatus according to an eighth embodiment.
Figure 12:
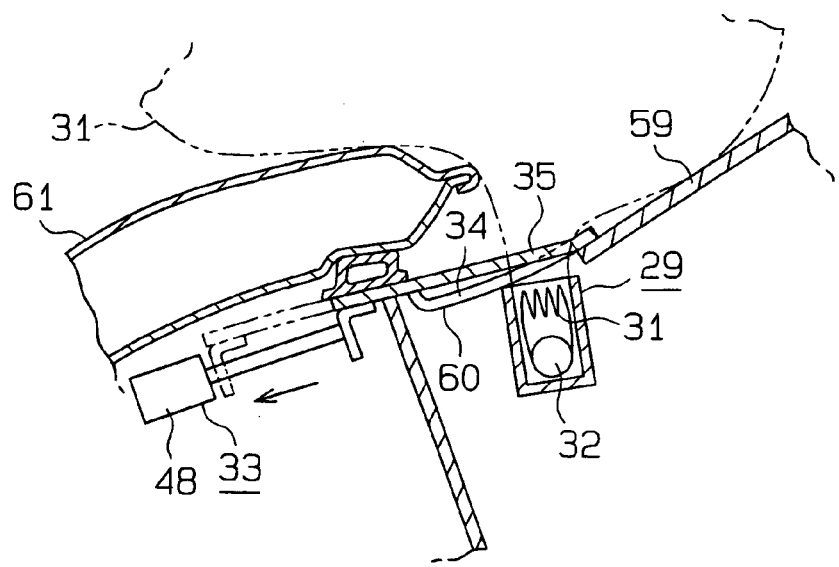
FIG. 12 is an enlarged partial cross-sectional view taken along line 12—12 of FIG. 11.

As shown in FIGS. 11 and 12, an airbag module 29 is located frontward of and below a windshield 59, and outside of the passenger compartment of a vehicle. The airbag module 29 is covered with a cowl louver 60. A port 34 is formed in the cowl louver 60 above the airbag module 29. The cover 35 closes the port 34. In response to excitation of opening-closing solenoids 48, the cover 35 is moved between a closed position to close the port 34 and an open position to open the port 34.

When a collision is predicted based on detection by the pre-crash sensor 42, the opening-closing solenoids 48 are excited to move the cover 35 to the open position. Accordingly, the port 34 is opened above the airbag module 29. If the collision sensor 43 detects a collision, the inflator 32 is activated to deploy the airbag 31 through the port 34 toward upper areas of the windshield 59 and a hood panel 61. The airbag 31 effectively absorbs the impact applied to an object that has collided with the vehicle.

In addition to the advantages of the embodiment shown in FIGS. 1 to 3, this embodiment provides the following advantages.

Based on a detection of a collision, the airbag 31 is deployed to cover the windshield 59. Therefore, an impact applied to a pedestrian or a motorcycle rider who hits the hood due to a collision is reduced. A pedestrian or a rider is effectively protected.

A ninth embodiment according to the present invention will now be described with reference to FIGS. 13 to 17.

Figure 13:
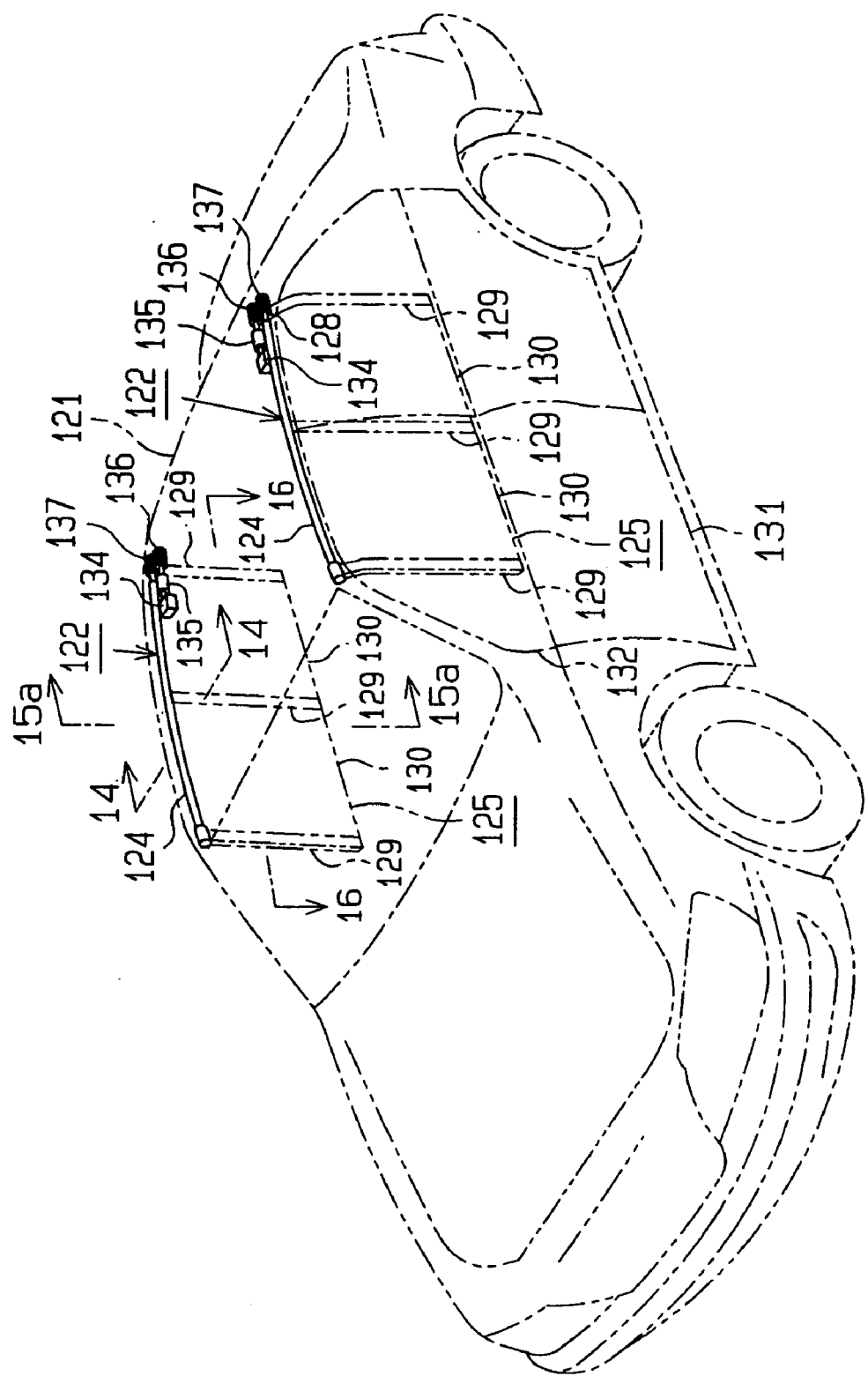
FIG. 13 is a perspective view illustrating a vehicle equipped with airbag apparatuses according to a ninth embodiment.
Figure 14:
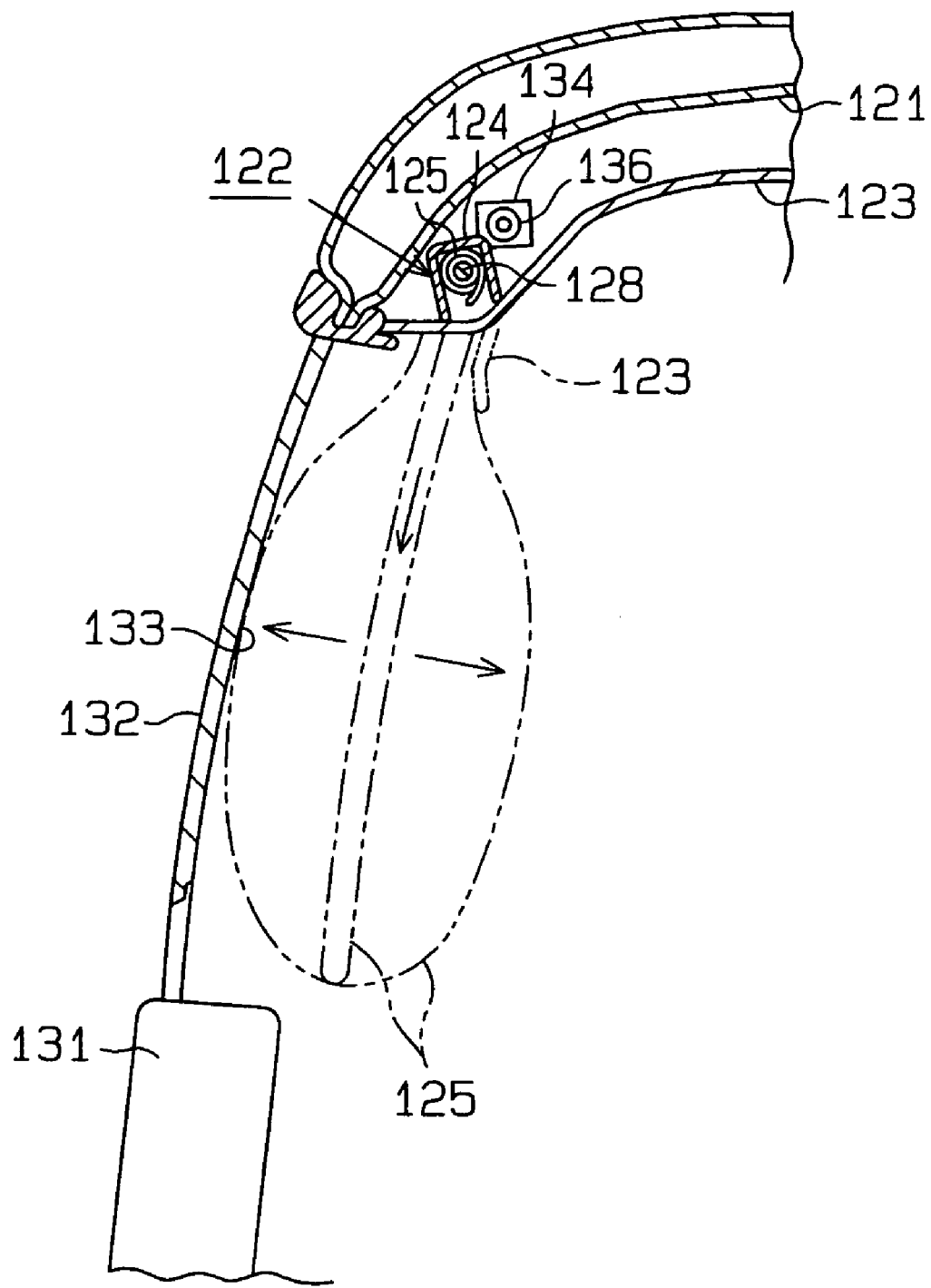
FIG. 14 is an enlarged partial cross-sectional view taken along line 14—14 of FIG. 13.

As shown in FIGS. 13 and 14, an airbag module 122 is provided at each side of an inner roof 121 of a vehicle. The airbag modules 122 are located in the vehicle passenger compartment. The lower portion of each airbag module 122 is covered by a head lining 123. Each airbag module 122 includes a case 124 that is open in a downward direction, and an airbag 125. Further, each airbag module 122 includes a deploying device, which comprises primary inflators 126, and an inflating device, which comprises secondary inflators 127. The primary inflators 126 and the secondary inflators 127 are shown in FIGS. 15(*a*) and 15(*b*).

Figure 15A:
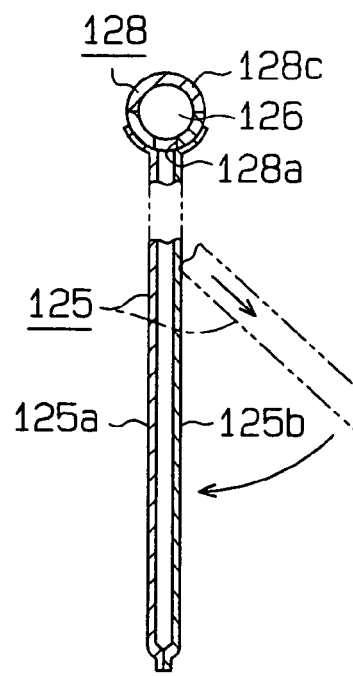
FIG. 15(a) is an enlarged partial cross-sectional view taken along line 15(a)—15(a) of FIG. 13.
Figure 15B:
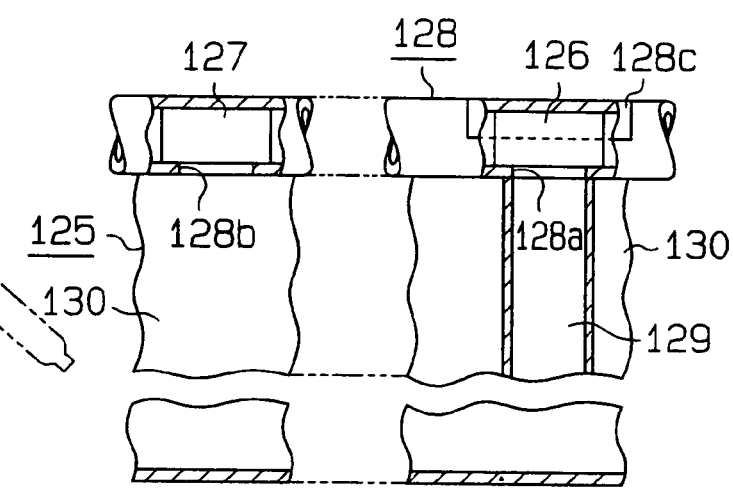
FIG. 15(b) is a partial cross-sectional view showing the relationship between one of the airbags and the corresponding inflator shown in FIG. 13.
Figure 16:
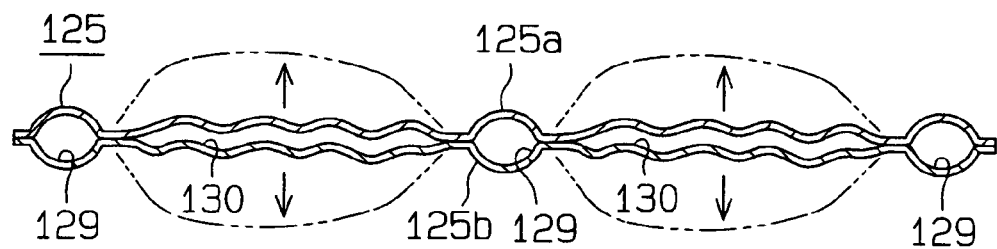
FIG. 16 is an enlarged cross-sectional view taken along line 16—16 of FIG. 13.
Figure 17:
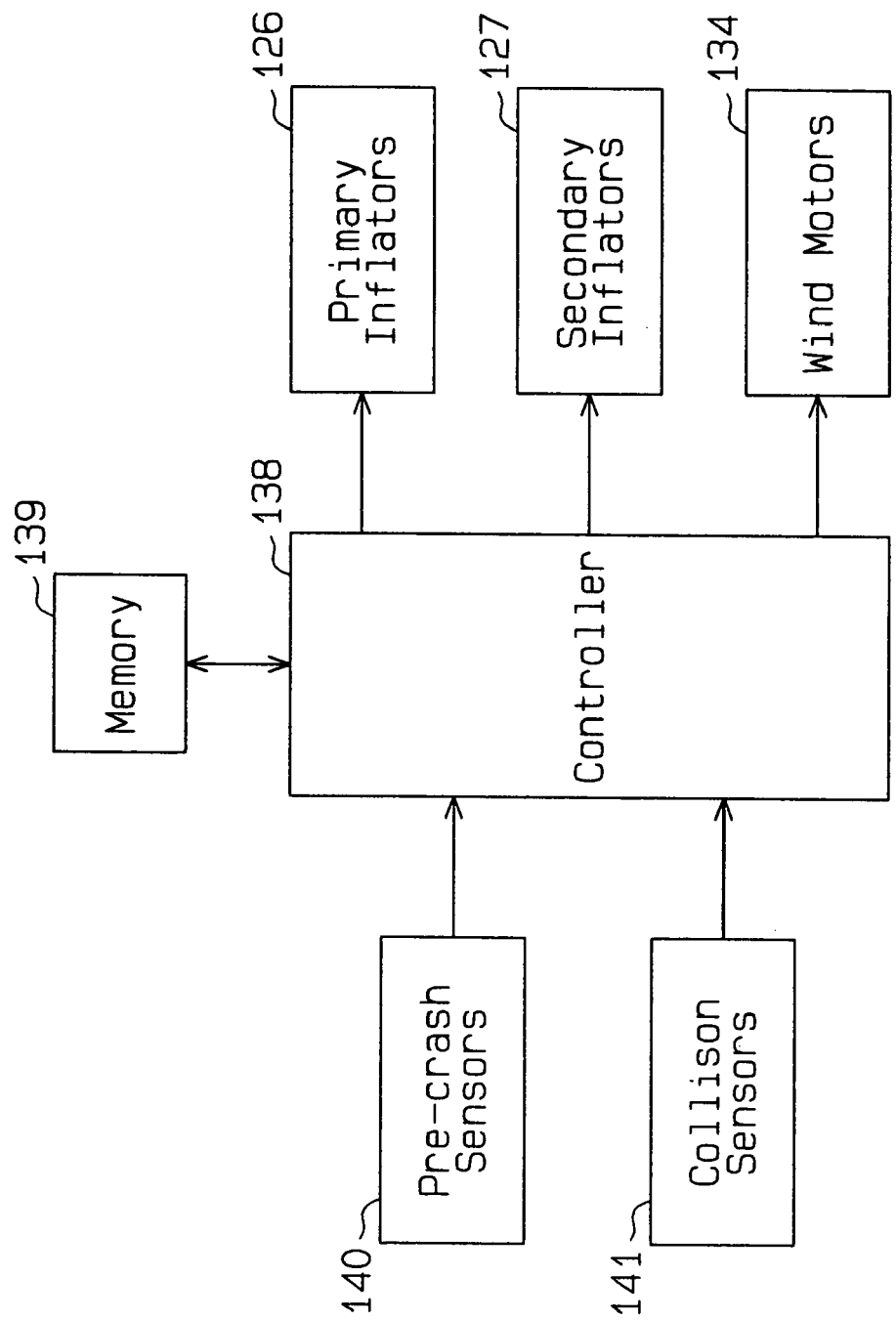
FIG. 17 is a block diagram showing the circuitry of the airbag apparatuses shown in FIG. 13.

As shown in FIGS. 14 to 15(*b*), one end of each airbag 125 is fixed to a rotatable scroll shaft 128 in the corresponding case 124. Each airbag 125 is rolled about the corresponding scroll shaft 128. Each airbag 125 is formed by sewing a first sheet 125*a* having a poor stretchability and a second sheet 125*b* having a high stretchability to each other. When each airbag 125 is deployed from the corresponding case 124 in a direction shown by broken lines in FIGS. 15(*a*), the deployment direction of the airbag 125 is shifted toward the first sheet 125*a* as shown by solid lines in FIG. 10 due to the difference of the stretchability of the sheets 125*a*, 125*b*. The first sheet 125*a*, is located the side corresponding to a window 132, and the airbag 125 is deployed along the window 132.

As shown in FIGS. 13, 15(*a*), 15(*b*), and 16, three first chambers 129 are formed in front, center, and rear portions of each airbag 125 in the traveling direction of the vehicle. The first chambers 129 extend in a direction perpendicular to the axis of the scroll shaft 128. Two second chambers 130 are defined in each airbag 125. The second chambers 130 are located between the first chambers 129.

As shown in FIGS. 15(*a*) and 15(*b*), the three primary inflators 126 in each scroll shaft 128 correspond to the first chambers 129, respectively. Each primary inflator 126 supplies gas to the corresponding first chamber 129 through an injection port 128*a* formed in the corresponding scroll shaft 128, thereby deploying the corresponding airbag 125. As a result, as shown by broken lines in FIGS. 13 and 14, the airbag 125 is deployed to be substantially flat. Specifically, the airbag 125 is deployed in a predetermined inflation region, that is, in an inflation region along the windows 132 of the doors 131. Accordingly, the airbag 125 is located between an occupant and the windows 132. Each primary inflator 126 can be replaced by removing a removable member 128*c* forming the corresponding scroll shaft 128 (see FIGS. 15(*a*) and 15(*b*)).

As shown in FIG. 15(*b*), two of the secondary inflators 127 are accommodated in each scroll shaft 128 to correspond to the two of the second chambers 130, respectively. Each secondary inflator 127 supplies gas to the corresponding second chamber 130 through an injection port 128*b* formed in the corresponding scroll shaft 128 after the corresponding airbag 125 is deployed. Gas supplied from the corresponding secondary inflator 127 inflates each airbag 125 at a predetermined position between the corresponding window 132 and an occupant as shown by broken lines in FIGS. 14 and 16.

As shown in FIGS. 13 and 14, a winding motor 134 is provided at each side of the inner roof 121. The motor shaft of each winding motor 134 is coupled to the scroll shaft 128 of the corresponding airbag module 122 with a one-way clutch 135 and gears 136, 137. Each winding motor 134 is activated when the airbag 125 is deployed and rotates the corresponding scroll shaft 128 to wind the corresponding airbag 125 into the case 124 when the airbag 125 has not been is inflated.

The circuitry of the airbag apparatus will now be described. A controller 138 shown in FIG. 17 stores programs for controlling the operation of the two entire airbag modules 122. There may be two controllers 138, each corresponding to one of the two airbag modules 122. A memory 139 is connected to the controller 138. The memory 139 stores data related to the timing at which the winding motors 134 are started after the airbags 125 are deployed.

At least two pre-crash sensors 140 and at least two collision sensors 141 are connected to the controller 138. Each pre-crash sensor 140 is located at a side portion of the vehicle. The pre-crash sensor 140 transmits ultrasonic wave or radio wave laterally from the side of the vehicle to detect an approaching object, and sends an approach detection signal to the controller 138. The controller 138 predicts the possibility of a crash from the side based on the approach detection signal from any of the pre-crash sensor 140. Each collision sensor 141 detects an actual frontal collision and sends a collision detection signal to the controller 138.

The controller 138 is connected to the primary inflators 126, the secondary inflators 127, and the winding motor 134 of each airbag module 122. When predicting a side collision, the controller 138 activates the primary inflators 126, thereby deploying the airbag 125 so that the airbag 125 is extended to a predetermined inflation region. If the controller 138 receives a collision detection signal from one of the collision sensors 141 while the corresponding airbag 125 is deployed, the controller 138 activates the corresponding secondary inflators 127 to further inflate the deployed airbag 125. If the corresponding collision sensor 141 does not output a collision signal for a predetermined period while the airbag 125 is deployed, the controller 138 rotates the winding motor 134. As a result, the airbag 125, which has not been inflated, is wound up by the scroll shaft 128 in the case 124.

An operation of the airbag module 122 will now be described.

During normal driving of the vehicle, the airbag 125 of each airbag module 122 is wound about the scroll shaft 128 in the corresponding case 124. If, in this state, the controller 138 predicts a side collision based on detection by one of the pre-crash sensors 140, the primary inflators 126 of the corresponding airbag module 122 are activated. Thus, each inflator 126 supplies gas to the corresponding first chamber 129 of the corresponding airbag 125. Accordingly, as shown by broken lines in FIGS. 13 and 14, the airbag 125 is deployed into a substantially flat shape in the inflation region along the window 132 of the corresponding door 131, while pushing an end of the head lining 123. The deployment of the airbag 125 rotates the scroll shaft 128. However, the one-way clutch 135 prevents the rotation from being transmitted to the winding motor 134.

Thereafter, when the collision sensor 141 detects an actual side collision, a collision detection signal is sent to the controller 138. This activates the secondary inflators 127 to supply gas to the corresponding second chambers 130. As shown by broken lines in FIGS. 14 and 16, the airbag 125 is inflated from the deployed state. The airbag 125 therefore reliably protects the occupant from the impact due to the side collision.

On the other hand, if the collision sensor 141 does not output a collision detection signal in a predetermined period after the airbag 125 is deployed, the controller 138 rotates the winding motor 134 of the airbag module 122 at the side where a collision is predicted. The rotation of the winding motor 134 causes the airbag 125 to be wound up by the scroll shaft 128 in the case 124.

Thereafter, the airbag 125 is manually deployed and the removable member 128c is removed from the scroll shaft 128 to replace the primary inflators 126 with new ones. Then, the winding motor 134 rotates the scroll shaft 128, and the end portion of the head lining 123 is closed. As a result, the airbag module 122 is restored to the original state to be ready for collisions.

This embodiment provides the following advantages.

Each airbag 125 is first deployed to the predetermined inflation region with gas supplied from the corresponding primary inflators 126. Then, the airbag 125 is further inflated from the deployed state with gas supplied from the secondary inflators 127. Therefore, the airbag 125 is deployed and inflated accurately into a predetermined shape at the predetermined position corresponding to the occupant. The occupant is therefore effectively protected from impacts due to a collision.

Each primary inflator 126 is activated when a collision is predicted based on detection by the corresponding pre-crash sensor 140. Each secondary inflator 127 is activated based on detection of a collision by the collision sensor 141. Therefore, based on the prediction of a collision, the airbag 125 is initially deployed. Thereafter, based on a detection of the collision, the deployed airbag 125 is inflated at an appropriate timing. Therefore, an occupant is effectively protected.

Each airbag 125 is made of the two sheets 125a, 125b having different stretchability. Therefore, guiding parts dedicated for limiting the deploying direction of each airbag 125 are not required. Based on the difference in the stretchability of the sheets 125a, 125b, each airbag 125 is reliably deployed in a desired direction. This simplifies the structure of the airbag module 122.

If the collision is avoided after the airbag 125 is deployed, the airbag 125, which has not been inflated, is wound about the scroll shaft 128 by the winding motor 134 in the case 124. Therefore, the airbag 125 does not disturb the driver. Further, by replacing the primary inflators 126, the airbag module 122 can be continuously used for protecting occupants from collisions.

A tenth embodiment of the present invention will now be described with reference to FIG. 18. The differences from the embodiment shown in FIGS. 13 to 17 will mainly be discussed.

Figure 18:
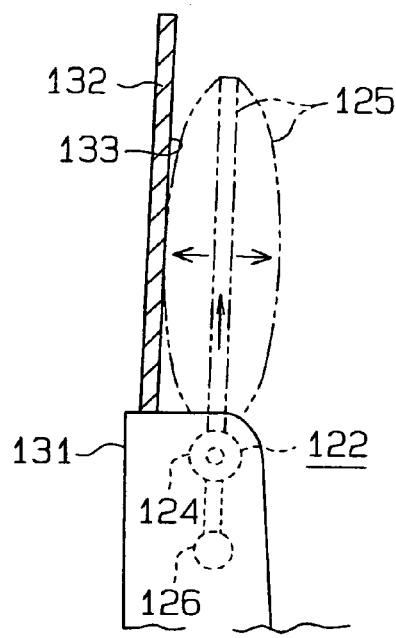
FIG. 18 is a partial cross-sectional view illustrating a vehicle equipped with an airbag apparatus according to a tenth embodiment.

As shown in FIG. 18, an airbag module 122 of this embodiment is located in an inner upper portion of a door 131. The airbag 122 has the same structure as the embodiment of FIGS. 13 to 17. When a side collision is predicted based on detection by a pre-crash sensor 140, the primary inflators 126 supply gas to the first chambers 129 of an airbag 125. Then, the airbag 125 projects upward through a port (not shown) at an upper portion of the door 131 along a window 132. Subsequently, the airbag 125 is deployed in a predetermined inflation region along the window 132 of the door 131.

Thereafter, when a collision sensor 141 detects the collision, the secondary inflators 127 supply gas to the second chambers 130 to inflate the deployed airbag 125.

This embodiment provides substantially the same advantages as the embodiment shown in FIGS. 13 to 17.

An eleventh embodiment of the present invention will now be described with reference to FIG. 19. The differences from the embodiment shown in FIGS. 13 to 17 will mainly be discussed.

Figure 19:
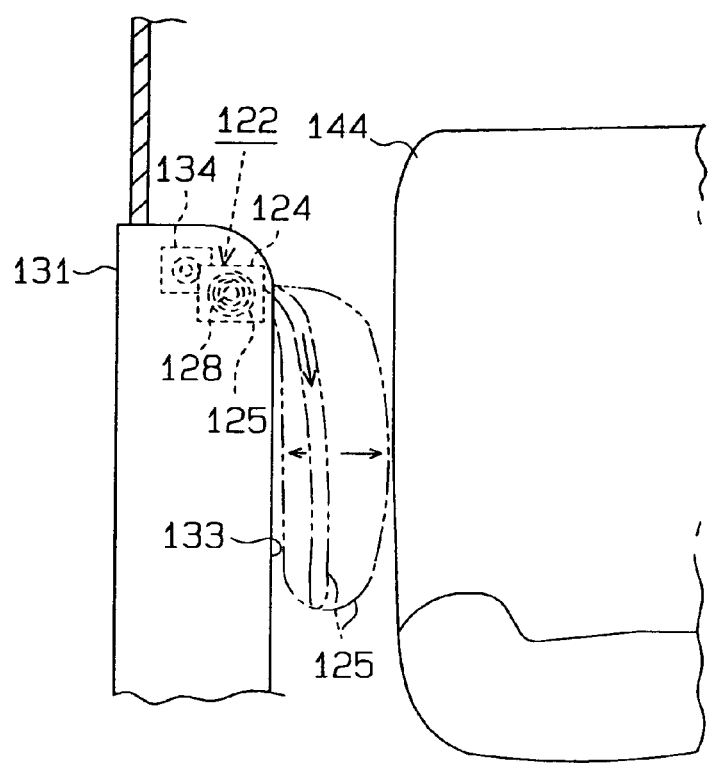
FIG. 19 is a partial cross-sectional view illustrating a vehicle equipped with an airbag apparatus according to an eleventh embodiment.

As in the embodiment of FIG. 18, an airbag module 122 of this embodiment is located in an inner upper portion of a door 131 as shown in FIG. 19. A projection port at the top portion of the door 131 opens toward the side of the door 131. In this embodiment, the stretchability of a first sheet 125a, of the airbag 125 is less than that of the corresponding member in the embodiment shown in FIGS. 13 to 17. The first sheet 125a, is shorter than a second sheet 125b in the deploying direction. When a collision is predicted based on detection by a pre-crash sensor 140, the primary inflator 126 supplies gas to the first chambers 129. Accordingly, the airbag 125 projects downward along the inner surface of the door 131. The airbag 125 is deployed in a predetermined inflation region along the inner surface (the side facing the passenger compartment) of the door 131, which forms a support surface 133.

In addition to the advantages of the embodiment shown in FIGS. 13 to 17, this embodiment provides the following advantages.

While being supported by the support surface 133, the airbag 125 is inflated into a predetermined shape at a predetermined position toward an occupant sitting on a seat 144. Therefore, the airbag 125 is prevented from being displaced from a position corresponding to the occupant. The airbag 125 thus effectively absorbs impact applied to the occupant.

A twelfth embodiment of the present invention will now be described with reference to FIG. 20. The differences from the embodiment shown in FIGS. 13 to 17 will mainly be discussed.

Figure 20:
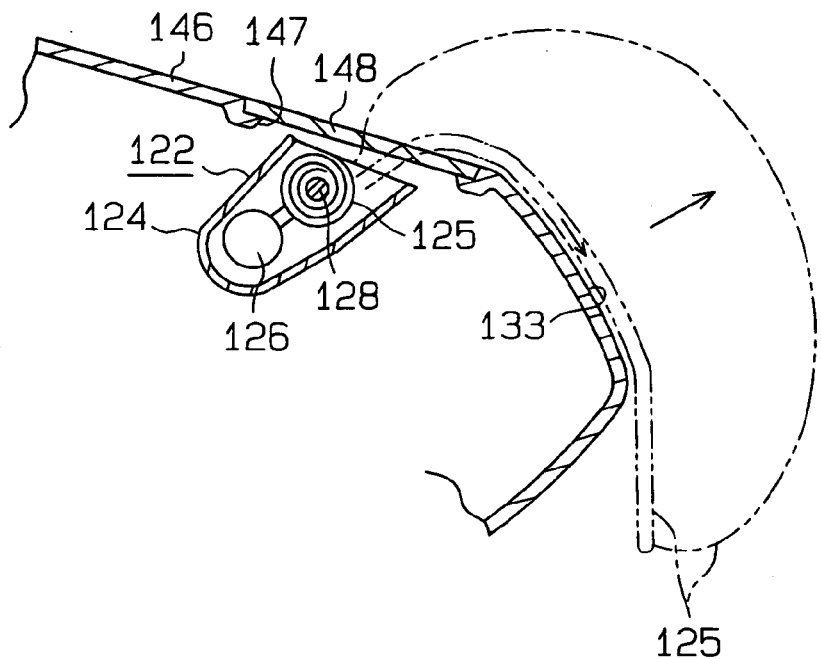
FIG. 20 is a partial cross-sectional view illustrating a vehicle equipped with an airbag apparatus according to a twelfth embodiment.

As shown in FIG. 20, an airbag module 122 of this embodiment is located in an instrument panel 146 and corresponds to an occupant on the front passenger seat. A pre-crash sensor 140 is located at a position to detect approaching objects. A collision sensor 141 is located at a position to detect a frontal collision.

A port 147 is formed in the instrument panel 146 above the airbag module 122. The port 147 is closed by a cover 148. When a collision is predicted based on detection by pre-crash sensor 140, a primary inflator 126 supplies gas to the airbag 125 so that the airbag 125 projects from the case 124 toward an occupant. While opening the cover 148, the airbag 125 is deployed into an inflation region along the upper surface of the instrument panel 146. The upper surface of the instrument panel 146 functions as a support surface 133. As in the embodiment shown in FIG. 19, a portion of the airbag 125 facing the instrument panel 146 is formed of a first sheet 125a, that has an extremely poor stretchability. The other side of the airbag 125 is formed of second sheet 125b, which is longer than the first sheet 125a, in the deploying direction of the airbag 125.

When an actual collision is detected, a secondary inflator 127 supplies gas to the airbag so that the deployed airbag 125 is inflated. In this case, while being supported by the support surface 133, the airbag 125 is inflated into a predetermined shape at a predetermined position toward an occupant sitting on the front passenger seat. Therefore, during a frontal collision, the airbag 125 is retained at an appropriate and effective position for protecting the occupant. If the collision is avoided when the airbag 125 is deployed, the airbag 125, which has not been inflated, is wound about the scroll shaft 128 by the winding motor 134 in the case 124.

This embodiment provides substantially the same advantages as the embodiment shown in FIG. 19.

A thirteenth embodiment of the present invention will now be described with reference to FIG. 21. The differences from the embodiment shown in FIG. 20 will mainly be discussed.

Figure 21:
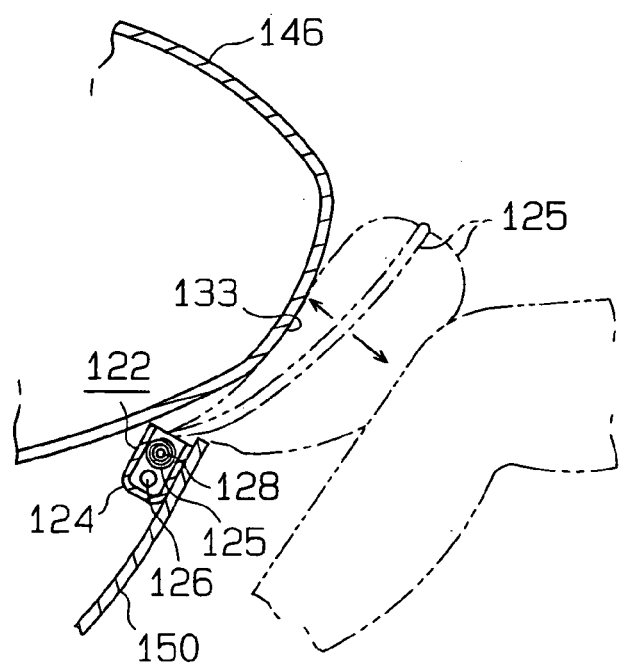
FIG. 21 is a partial cross-sectional view illustrating a vehicle equipped with an airbag apparatus according to a thirteenth embodiment.

As shown in FIG. 21, an airbag module 122 is located below an instrument panel 146. The airbag module 122 is attached to a support plate 150 and is oriented in a slanting upward direction.

When a collision is predicted based on detection by a pre-crash sensor 140, a primary inflator 126 supplies gas to the airbag 125 so that the airbag 125 protrudes from a case 124 in a slanting upward direction. The airbag 125 is deployed in a predetermined inflation region along a support surface 133, which is formed by the lower surface of the instrument panel 146.

When an actual collision is detected, a secondary inflator 127 supplies gas to the airbag so that the deployed airbag 125 is inflated. In this case, while being supported by the support surface 133, which is formed by the rear lower surface of the instrument panel 146, the airbag 125 is inflated into a predetermined shape at a predetermined position toward the knees of an occupant sitting. Therefore, the airbag module 122 of this embodiment is effective to protect the lower limbs of an occupant. If the collision is avoided when the airbag 125 is deployed, the airbag 125, which has not been inflated, is wound about the scroll shaft 128 by the winding motor 134 in the case 124.

This embodiment provides substantially the same advantages as the embodiments shown in FIGS. 19 to 20.

A fourteenth embodiment of the present invention will now be described with reference to FIG. 22. The differences from the embodiment shown in FIGS. 13 to 17 will mainly be discussed.

Figure 22:
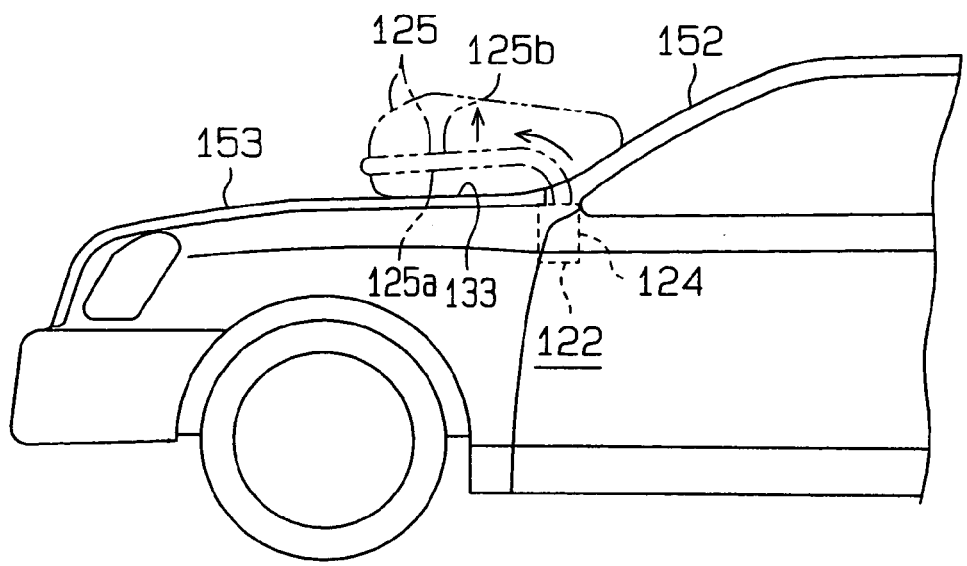
FIG. 22 is a partial side view illustrating a vehicle equipped with an airbag apparatus according to a fourteenth embodiment.

As shown in FIG. 22, an airbag module 122 of this embodiment is located outside the passenger compartment of a vehicle and below the windshield 152. A pre-crash sensor 140 is located at a position to detect an approaching object. A collision sensor 141 is located at a position to detect a frontal collision. As in the embodiment of FIG. 19, the airbag 125 is formed of a first sheet 125a, and a second sheet 125b.

When a collision is predicted, a primary inflator 126 supplies gas into the airbag 125. Due to differences in the stretchabilities and the lengths of the sheets 125a, 125b, the airbag 125 projects onto a hood panel 153 from the rear side. The airbag 125 is deployed to extend in an expansion region from the upper side of the rear end of the hood panel 153 to the upper surface of the windshield 152.

When an actual collision is detected, a secondary inflator 127 supplies gas to the airbag so that the deployed airbag 125 is inflated. In this case, the airbag 125 is inflated into a predetermined shape at a predetermined position while being supported by a support surface 133, which is formed by the upper surface of the hood panel 153 and the upper surface of the windshield 152. Therefore, an impact of an external object, which can be a pedestrian, is effectively absorbed, and the object is prevented from colliding with the windshield 152. If the collision is avoided when the airbag 125 is deployed, the airbag 125, which has not been inflated, is wound back to the case 124 as in the embodiment of FIGS. 13 to 17.

Although designed for protecting external objects, this embodiment provides substantially the same advantages as the embodiments shown in FIGS. 19 to 21.

A fifteenth embodiment of the present invention will now be described with reference to FIG. 23. The differences from the embodiment shown in FIG. 22 will mainly be discussed.

Figure 23:
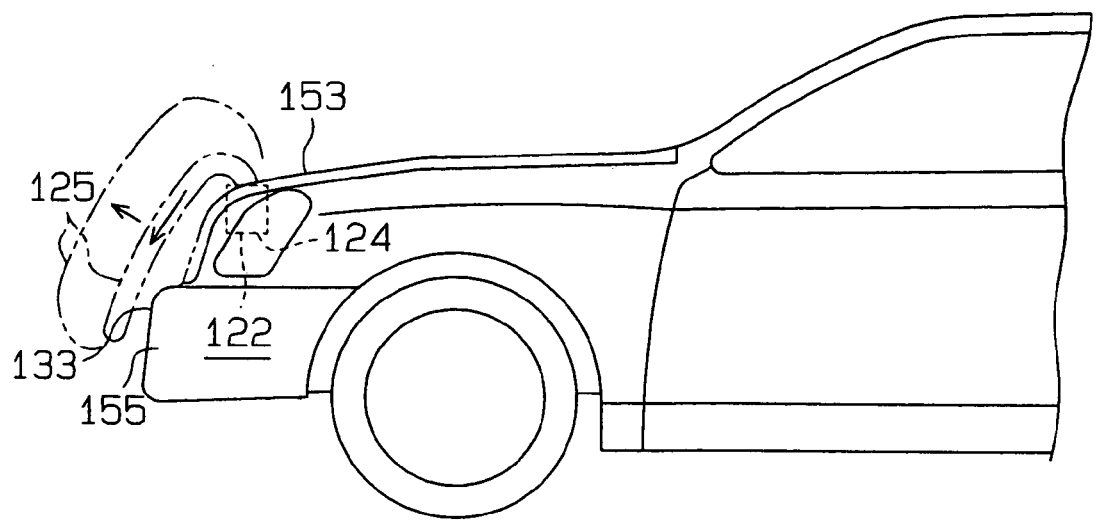
FIG. 23 is a partial side view illustrating a vehicle equipped with an airbag apparatus according to a fifteenth embodiment.

As shown in FIG. 23, an airbag module 122 of this embodiment is located outside the passenger compartment of a vehicle, specifically above a bumper 155 and in a hood panel 153.

When a collision is predicted, a primary inflator 126 supplies gas into the airbag 125 so that the airbag 125 projects upward, for example, through a gap between the radiator grill and the hood panel 153. The airbag 125 is deployed to extend in an expansion region from the upper side of the front end of the hood panel 153 to the front side of the bumper 155.

When an actual collision is detected, a secondary inflator 127 supplies gas to the airbag so that the deployed airbag 125 is inflated. In this case, the airbag 125 is inflated into a predetermined shape at a predetermined position while being supported by a support surface 133, which includes a front part of the hood panel 153 and a front part of the bumper 155. The impact applied by an external object is effectively absorbed. Further, this embodiment prevents a pedestrian from colliding with the bumper 155. If the collision is avoided when the airbag 125 is deployed, the airbag 125, which has not been inflated, is wound back to the case 124.

This embodiment provides the same advantages as the embodiment shown in FIGS. 22.

It should be apparent to those skilled in the art that the present invention may be embodied in many other specific forms without departing from the spirit or scope of the invention. Particularly, it should be understood that the invention may be embodied in the following forms.

In each of the embodiments shown in FIGS. 1 to 12, the closing mechanism for closing the port 34 may be provided separately from the opening mechanism for opening the port 34.

In the embodiments of FIGS. 5 and 6, the port 34 in the head lining 47 of the inner roof 46 may be replaced with a port formed at the upper end of the garnish 53 at the pillar 52.

In the embodiment of FIG. 6, a restoring mechanism for returning the airbag module 29 to the initial position may be independently provided from the displacing solenoid 51.

In the embodiment of FIG. 6, the displacing solenoid 51, which also functions as a restoring mechanism, may be restored by manipulation of a switch.

If the port 34 is not opened for some reason when a collision is predicted in the embodiments of FIGS. 4 to 12, the port 34 may be opened by the inflation of the airbag 31 as in the embodiment shown in FIGS. 1 to 3. In this case, a cover of the airbag module has grooves at which the cover is broken.

In the embodiments shown in FIGS. 1 to 12, the cover 35 may be manually opened. This configuration facilitates replacing and checking the airbag module 29.

In the embodiments shown FIGS. 1 to 12, the airbag 31 may be deployed and inflated based on detection by the pre-crash sensor 42. For example, when a collision is predicted based on detection by the pre-crash sensor 42, the airbag 31 may be deployed when a predetermined period has elapsed. This configuration eliminates the necessity of collision sensors and the related parts, which simplifies the structure. In this case, the fact that the pre-crash sensor 42 continues detecting an object after first detecting the object may be added to conditions to determine that the airbag 31 be deployed.

In the embodiments shown in FIGS. 13 to 19, the airbag 25, which has not been inflated, may be wound back based on manipulation of a switch.

The present invention may be applied to an airbag apparatus that is provided in a passenger compartment at an upper portion of a rear window. In this case, the airbag is deployed along the rear window. In this case, a pre-crash sensor is located at a position to detect an object approaching from behind. A collision sensor 141 is located at a position to detect a rear-end collision. That is, the airbag apparatus is designed for rear-end collisions.

In the embodiments 13 to 17, the airbag 125 may be structured to be drawn in normal states and used as a sun shade.

Therefore, the present examples and embodiments are to be considered as illustrative and not restrictive and the invention is not to be limited to the details given herein, but may be modified within the scope and equivalence of the appended claims.

The invention claimed is:

1. An airbag apparatus used for a vehicle, comprising:
a pre-crash sensor for detecting an object approaching the vehicle;
a collision sensor for detecting an impact applied to the vehicle;
an airbag;
an inflating device, which is activated based on detection by the collision sensor to inflate the airbag; and
a deploying device, wherein the deploying device is activated based on detection by the pre-crash sensor so that, prior to inflation of the airbag, the deploying device deploys the airbag in a folded state over a predetermined inflation region.

2. The apparatus according to claim 1, wherein the vehicle has a support surface for supporting the airbag, and wherein the airbag is deployed along the support surface, whereby the deployed airbag receives an occupant at a side opposite from the side facing the support surface.

3. The apparatus according to claim 1, wherein, prior to inflation of the airbag, the deploying device deploys the airbag at a position corresponding to an occupant.

4. The apparatus according to claim 1, wherein the airbag has a first chamber and a second chamber, the first chamber extending along the deploying direction of the airbag, wherein the deploying device comprises a primary inflator for supplying gas to the first chamber to deploy the airbag, and wherein the inflating device comprises a secondary inflator for supplying gas to the second chamber to inflate the airbag.

5. An airbag apparatus used for a vehicle, comprising:
an airbag;
an inflating device for inflating the airbag;
a deploying device, wherein, prior to inflation of the airbag, the deploying device deploys the airbag in a folded state over a predetermined inflation region; and
a restoring mechanism, wherein, if the inflation device is not activated after the deploying device is activated, the restoring mechanism restores the deployed airbag to the prior state.

6. The apparatus according to claim 5, wherein the restoring mechanism includes a scroll shaft for winding the airbag and a motor for rotating the scroll shaft.

7. A method for deploying and inflating an airbag used for a vehicle, comprising:
predicting a collision against the vehicle;
deploying the airbag in a folded state over a predetermined inflation region when a collision is predicted;
detecting a collision against the vehicle; and
inflating the deployed airbag when a collision is detected.

\* \* \* \* \*